(12) United States Patent
Lavedas

(10) Patent No.: US 8,098,161 B2
(45) Date of Patent: Jan. 17, 2012

(54) RADIO FREQUENCY IDENTIFICATION INLAY WITH IMPROVED READABILITY

(75) Inventor: Thomas G. Lavedas, Clifton, VA (US)

(73) Assignee: Raytheon Company, Waltham, MA (US)

( * ) Notice: Subject to any disclaimer, the term of this patent is extended or adjusted under 35 U.S.C. 154(b) by 503 days.

(21) Appl. No.: 12/325,413

(22) Filed: Dec. 1, 2008

(65) Prior Publication Data

US 2010/0134291 A1    Jun. 3, 2010

(51) Int. Cl.
*G08B 13/14* (2006.01)

(52) U.S. Cl. ........... 340/572.7; 340/572.8; 343/841; 343/843; 343/844; 343/846; 343/893

(58) Field of Classification Search ....... 340/572.7, 340/572.8, 568.7, 572.5, 10.1; 343/842, 343/843, 844, 846, 893
See application file for complete search history.

(56) References Cited

U.S. PATENT DOCUMENTS

| | | | |
|---|---|---|---|
| 5,572,226 A | 11/1996 | Tuttle | |
| 5,817,207 A * | 10/1998 | Leighton | 156/298 |
| 6,147,605 A | 11/2000 | Vega et al. | |
| 6,195,006 B1 | 2/2001 | Bowers et al. | |
| 6,204,764 B1 | 3/2001 | Maloney | |
| 6,281,794 B1 | 8/2001 | Duan et al. | |
| 6,535,175 B2 | 3/2003 | Brady et al. | |
| 6,696,952 B2 | 2/2004 | Zirbes | |
| 6,989,750 B2 | 1/2006 | Shanks et al. | |
| 7,042,419 B2 * | 5/2006 | Werner et al. | 343/909 |
| 7,064,668 B2 * | 6/2006 | Porad | 340/572.1 |
| 7,100,835 B2 | 9/2006 | Selker | |
| 7,330,161 B2 * | 2/2008 | Matsugatani et al. | 343/909 |
| RE40,145 E * | 3/2008 | Leighton | 340/572.1 |
| 7,375,639 B2 | 5/2008 | Dixon et al. | |
| 7,460,071 B2 * | 12/2008 | Manholm et al. | 343/700 MS |
| 7,612,676 B2 * | 11/2009 | Yuen et al. | 340/572.7 |
| 7,714,724 B2 * | 5/2010 | Halope et al. | 340/572.1 |
| 2004/0207527 A1 | 10/2004 | Shanks et al. | |
| 2005/0093677 A1 | 5/2005 | Forster et al. | |
| 2005/0093678 A1 | 5/2005 | Forster et al. | |
| 2008/0231458 A1 | 9/2008 | Fein | |
| 2008/0238684 A1 * | 10/2008 | Tuttle | 340/572.7 |
| 2010/0001080 A1 * | 1/2010 | Sim et al. | 235/492 |

OTHER PUBLICATIONS

Two RF Inputs Make a Better RFID Tag, May 2006, Symbol the Enterprise Mobility Company, pp. 1-4.

(Continued)

*Primary Examiner* — Benjamin C Lee
*Assistant Examiner* — Peter Mehravari
(74) *Attorney, Agent, or Firm* — Daly, Crowley, Mofford & Durkee, LLP

(57) ABSTRACT

A radio-frequency identification (RFID) inlay is provided that is substantially isolated from the environment in proximity to one side of the device. A radio-frequency identification (RFID) inlay is provided including a two-port microchip having a first and a second port, a first antenna coupled to the first port of the two-port microchip, a ground-plane, a first high-impedance body disposed substantially parallel to the first antenna and between the first antenna and the ground-plane, the first high-impedance body insulated from the ground-plane. The RFID inlay further includes a second antenna coupled to the second port of the two-port microchip, and a second high-impedance body disposed substantially parallel to the second antenna and between the second antenna and the ground-plane, the second high-impedance body insulated from the ground-plane.

36 Claims, 9 Drawing Sheets

OTHER PUBLICATIONS

Symbol Technologies Launches Portfolio of RFID Gen 2 and Specialty Tag Inlays, May 1, 2006, pp. 1-2.

Mardev Asia, May 1, 2006, Symbol Technologies Launches Portfolio of RFID Inlays and Trays, 1 page.

Abedin, M.F., A Low Profile Dipole Antenna Backed by a Planar EBG Structure, Department of Electrical Engineering, 2006, pp. 13-16 U.of S.C.

Apostolopoulos, O.G. et al., Electromagnetic Band Gap Characteristics From Closely Coupled Double Layer and Dipole and Tripole Arrays, 2003, The Institute of Electrical Engineers, pp. 409-412.

Whites, Keith W. et al., Easily Designed and Constructed High Impedance Surfaces, Department of Electrical and Computer Engineering, 2003, pp. 407-410, South Dakota School of Mines and Technology, Rapid City, SD.

Sergio et al., Design Methodology for Sievenpiper High-Impedance Surfaces: An Artificial Magnetic Conductor for Positive Gain Electrically Small Antennas, 2003, pp. 2678-2690, IEEE Antennas and Wirless Propagation, vol. 51, No. 10.

Sievenpiper, D., et al., High-Impedance Electromagnetic Surfaces With a Forbidden Frequency Band, 1999, pp. 2059-2074, IEEE Transactions on Microwave Theory and Techbiques, vol. 47, No. 11.

Azcona, L. et al., Micromachined Electromagnetic Bandgap Crystals As Antenna Substrates for a 500 GHz Imaging Array, pp. 1-7, May 21, 2003.

Ukkonen, L., et al., Effects of Metallic Plate Size on the Performance of Microstrip Patch Type Tag Antennas for Passive RFID, 2005, pp. 410-413, IEEF Antennas and Wireless Propagation Letters, vol. 4.

\* cited by examiner

430 ⟶    432  434

RADIO FREQUENCY IDENTIFICATION INLAY WITH IMPROVED READABILITY

FIELD OF THE INVENTION

This inventive systems, techniques, and concepts described herein relate generally to personal authentication tags and more particularly to ultra-high frequency (UHF) radio frequency identification (RFID) inlays with improved readability characteristics.

BACKGROUND

It is common practice for governmental agencies to regulate access to territorial borders. It is also common for businesses and organizations to control access to portions of business property such as research and development areas, controlled areas such as flight line access, airports, seaports, vendor-only areas in trade shows, and many other locations. Organizations control access using a variety of methods, including gated entry, video surveillance, etc., together with identification cards such as passports, visas, birth certificates, social security cards, license numbers, and employee identification cards. For example, an organization may require an employee to present his or her card to security personnel at facility entrances to be permitted access to the facility.

Radio Frequency Identification (RFID) systems are increasingly being used to automate access to controlled areas. RFID systems include personal cards are encoded with a unique identification number. An identification apparatus such as a transponder communicates with the card to obtain the card's unique identification number, authenticate the card, and to grant/deny the card user access to a controlled area. RFID systems are also used to track inventory, typically using RFID tags affixed to boxed items, product surfaces, etc.

Most RFID systems operate at a very low frequency, which limits RFID detection to within a few inches between the card and the identification apparatus. However, some RFID systems, such as those which operate at ultra-high Frequency (UHF) bands, have considerably longer ranges, for example, tens of feet between the RFID card and the identification apparatus.

One problem with UHF RFID is that a card user or tagged entity can partially absorb and detune the RF electromagnetic energy required for RFID detection. One possible solution is to require the RFID card user to properly present the card in close proximity to the identification apparatus, for example, by contacting the card with a wall-mounted transponder. However, RFID card users often fail to properly present the card, resulting in degradation of RFID performance. In many instances, the card may be obscured, for example, in a pocket, purse, or wallet, causing RFID card blockage and detection failure. An RFID tag may be obscured by surfaces of the tracked inventory, for example, a metallic surface, resulting in RFID tag blockage and detection failure.

FIGS. 6 and 7 illustrate conventional UHF RFID card designs which suffer from poor detectability when the RFID card user fails to properly present the card to the detection apparatus. FIG. 6 illustrates a conventional RFID card having a simple single-port microchip RFID inlay 600, which includes a UHF antenna 604 and a one-port microchip 602. The RFID card suffers significant RF signal degradation when the user's hand obscures a portion of the antenna 604.

FIG. 7 illustrates a conventional RFID card having a RFID inlay 700 with a two-port microchip 702 and two UHF antennas 704, 706 coupled to the two-port microchip 702. The RFID inlay 700 alleviates the degradation problem with the single antenna inlay 600 by providing a second antenna 706 insulated from a first antenna 704. Thus, when the RFID card user's hand obscures one antenna, detection is maintained via the other antenna. However, in some instances, the user's hand can obscure the first and second antennas 704, 706, causing detection failures. Also, the conventional two antenna inlay 700 does not resolve detection problems when the user places the RFID card in a pocket, purse, or wallet.

SUMMARY

In accordance with the inventive systems, techniques, and concepts described herein, a radio-frequency identification (RFID) inlay includes a microchip, an antenna coupled to a port of the microchip, a ground-plane, and a high-impedance body. The ground-plane is disposed substantially parallel to the antenna. Also, the high-impedance body is disposed substantially parallel to the antenna and between the antenna and the ground-plane.

In another aspect, a radio-frequency identification (RFID) inlay includes a two-port microchip, a first and second antenna, a ground-plane, and a first and second high-impedance body.

The two-port microchip has a first and a second port. The first antenna is coupled to the first port, and the second antenna is coupled to the second port. The first high impedance body is disposed substantially parallel to the first antenna and between the first antenna and the ground-plane. Also, the first high-impedance body is insulated from the ground-plane. The second high-impedance body is disposed substantially parallel to the second antenna and between the second antenna and the ground-plane. Also, the second high-impedance body is insulated from the ground-plane.

With this particular arrangement, a RFID inlay is provided including a high-impedance body isolating the antenna from external bodies and structures which can detune and degrade antenna performance. The RFID inlay provides either single or double-sided performance, depending on whether a high-impedance body is disposed on one or both sides of the ground-plane, respectively.

BRIEF DESCRIPTION OF THE DRAWINGS

The foregoing features of this invention, as well as the invention itself, may be more fully understood from the following description of the drawings in which.

DETAILED DESCRIPTION

I. Definitions

RFID Inlay: A RFID inlay includes, but is not limited to, an antenna, microchip, and other components of the claimed invention used primarily for communications with a transponder. The RFID inlay may be encoded with a unique code for identification purposes.

RFID Tag: A RFID tag is an RFID inlay having further elements for tagging, labeling, or marking objects for identification and tracking, for example, within supply chain and inventory tracking. The RFID tag can include an adhesive strip to affix the RFID tag to various objects and surfaces.

RFID Card: A RFID card is a RFID inlay having further elements used for personal identification and controlled access. The RFID card can include, for example, a card user photograph, a logo, etc., as further explained below.

II. Description

Figure 1A:
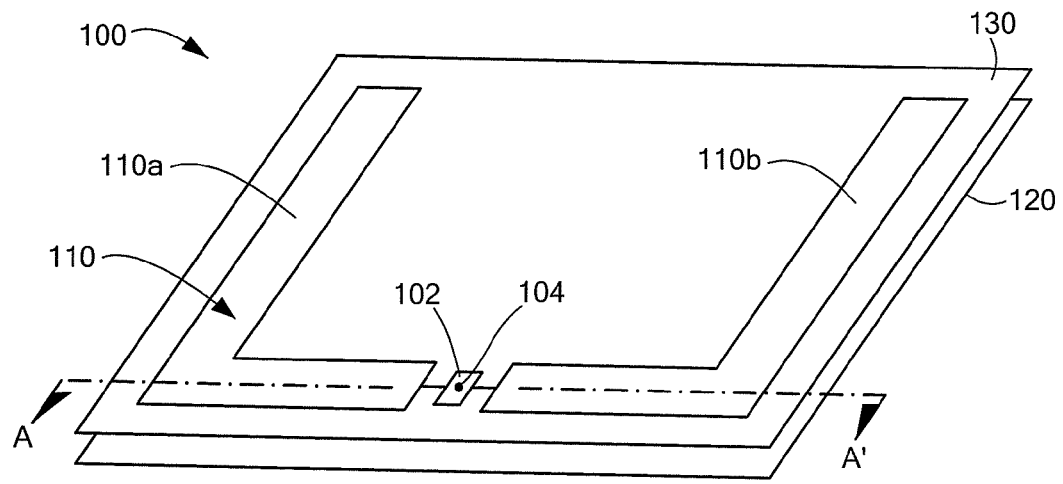
FIG. 1A illustrates an embodiment of a single-sided RFID inlay of the inventive systems, techniques, and concepts.

Referring to FIG. 1A, at least one embodiment of the inventive systems, techniques, and concepts described herein includes a radio-frequency identification (RFID) inlay 100 including a microchip 102, an antenna 110 coupled to a port 104 of the microchip 102, a ground-plane 120, and a high-impedance body 130.

Figure 1B:
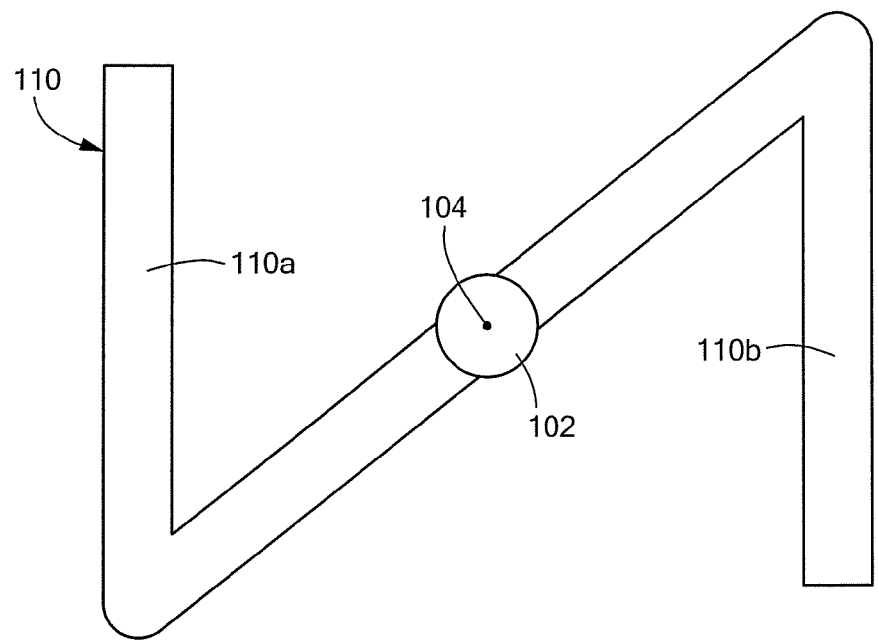
FIG. 1B a Z-shaped antenna configuration for use with the RFID inlay of FIG. 1A.

The antenna 110 includes at least a first element 110a and at least one second element 110b, each coupled to the microchip port 104 of microchip 102. It will be understood that the antenna 110 may be applied in various configurations as a printed circuit on a plastic inlay. For example, the antenna 110 may be applied as a C-shaped (shown in FIG. 1A) or Z-shaped printed circuit on a plastic inlay, although the antenna 110 is not limited to these configurations. For example, referring to FIG. 1B in which like elements of FIG. 1A are shown with like reference numerals, a Z-shaped antenna 110 includes at least a first element 110a and at second element 110b, each coupled to the microchip port 104 of a microchip 102.

The ground-plane 120 and the high-impedance body 130 are disposed substantially parallel to the antenna 110. Also, the high-impedance body 130 is disposed between the antenna 110 and the ground-plane 120.

Figure 1C:
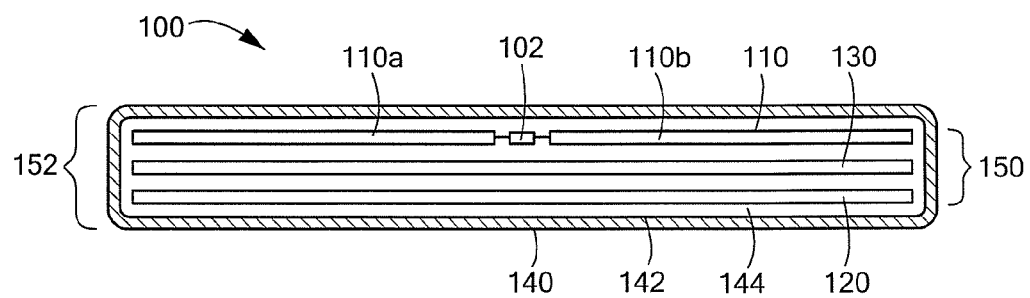
FIG. 1C is a cross-sectional view of the RFID inlay of FIG. 1A at reference line AA'.

Referring to FIG. 1C, a further embodiment of the RFID inlay 100 includes laminate material 140 disposed over an outer surface 142 of the RFID inlay 100. The components of the RFID inlay (antenna 110, high-impedance surface 130, ground-plane 120, and microchip 102) may be suspended and separated from each other within a medium 144, for example, a dielectric material such as a plastic.

Figure 2A:
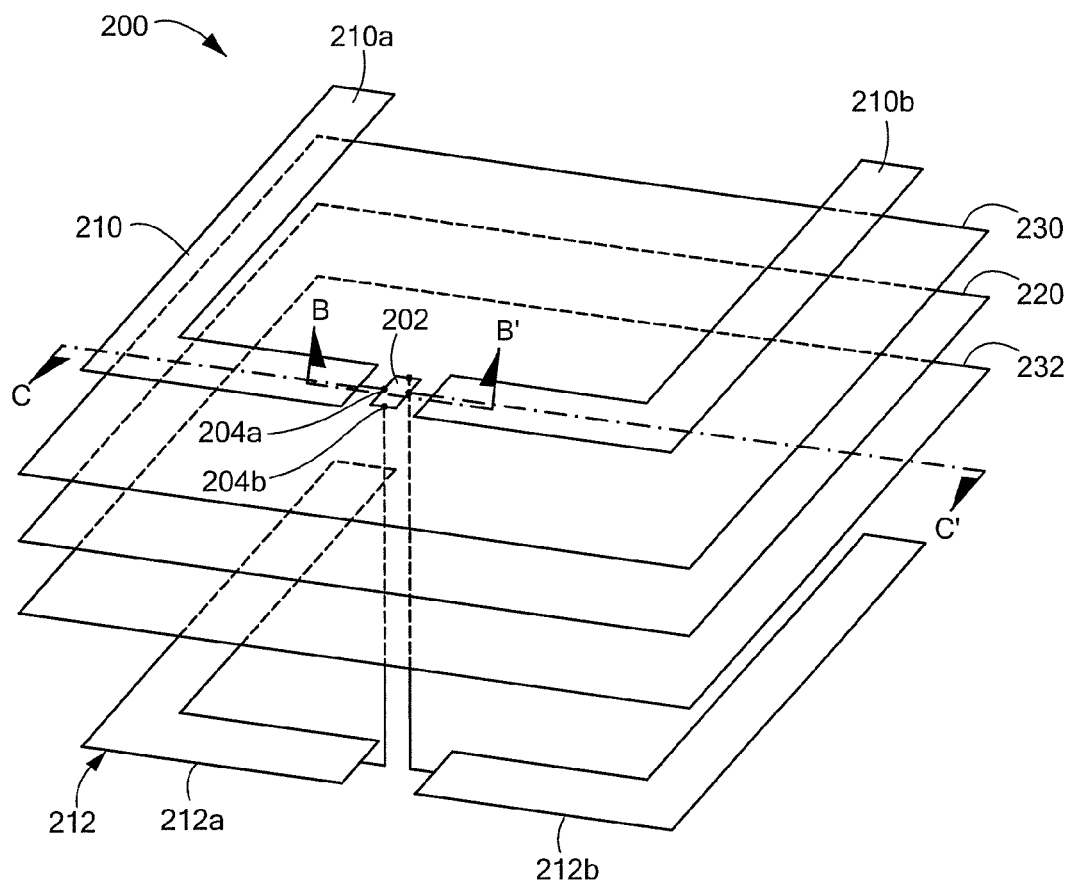
FIG. 2A illustrates an embodiment of a double-sided RFID inlay of the inventive systems, techniques, and concepts.

Referring to FIG. 2A, a double-sided embodiment of the inventive systems, techniques, and concepts described herein, a RFID inlay 200 includes a two-port microchip 202, a first antenna 210, a second antenna 212, a ground-plane 220, a first high-impedance body 230, and a second high-impedance body 232.

Figure 2B:
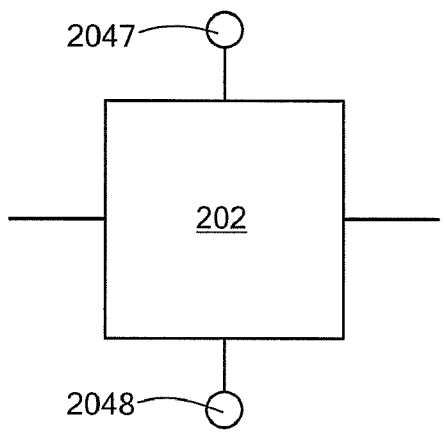
FIG. 2B is a cross-sectional view of the two-port microchip and connections shown at line BB' of FIG. 2A.

The two-port microchip 202 has a first port 204a and a second port 204b. The first antenna 210 is coupled to the first port 204a and the second antenna 212 is coupled to the second port 204b Referring to FIG. 2B showing a cross-sectional view of two-port microchip 202 at line BB' of FIG. 2A, connections between the first and second antennas 210, 212 and the two-port microchip 202 may be achieved with plated through holes 2047, 2048 or vias. The first and second ports 204a, 204b may be electrically isolated from each other, and thus, the first and second antennas 210, 212 are independent from each other. That is, the two-port microchip 202 can draw its power from and operate through either antenna 210, 212 in an independent manner, based on which of the antennas 210, 212 is positioned to provide the best performance.

The first high-impedance body 230 is disposed substantially parallel to the first antenna 210 and between the first antenna 210 and the ground-plane 220. Also, the first high-impedance body 230 is insulated from the ground-plane 220 by a thin layer of a suitable, low-loss dielectric material, such as polyethylene terephthalate (PET).

The second high-impedance body 232 is disposed substantially parallel to the second antenna 212 and between the second antenna 212 and the ground-plane 220, and is insulated from the ground-plane 220 in much the same way as the first high-impedance body 230.

The first antenna 210 includes at least two elements 210a, 210b, and the second antenna 212 includes at least two elements 212a, 212b. Elements 210a and 210b are coupled to port 204a, and elements 212a and 212b are coupled to port 204b. The first and second antennas 210, 212 may be c-shaped flat antennas.

Figure 2C:
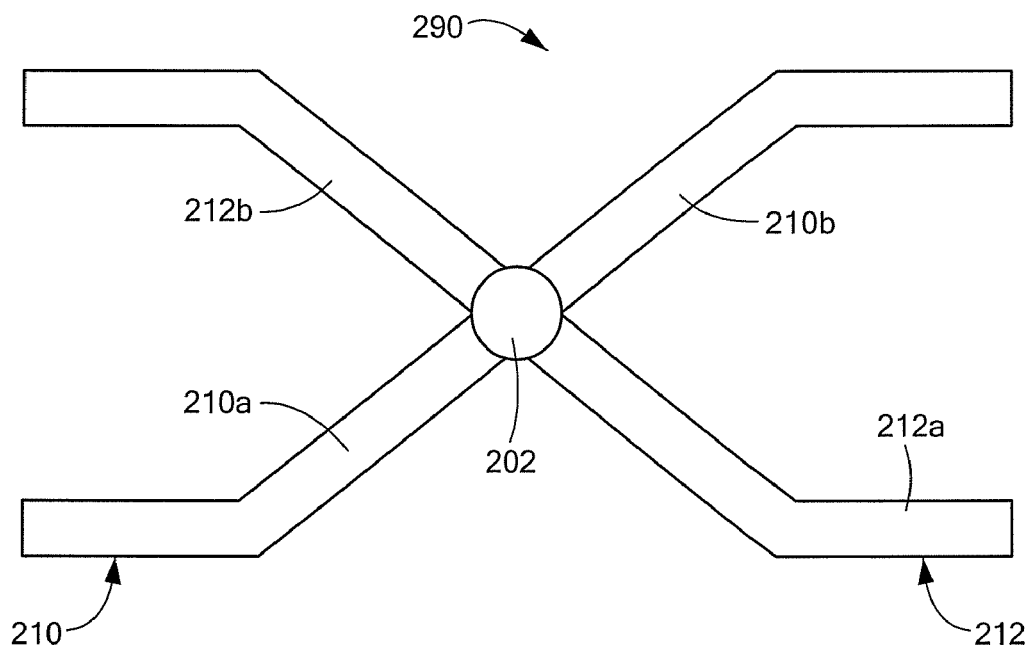
FIG. 2C an X-shaped configuration of antennas for use with the RFID inlay of FIG. 2A.
Figure 2D:
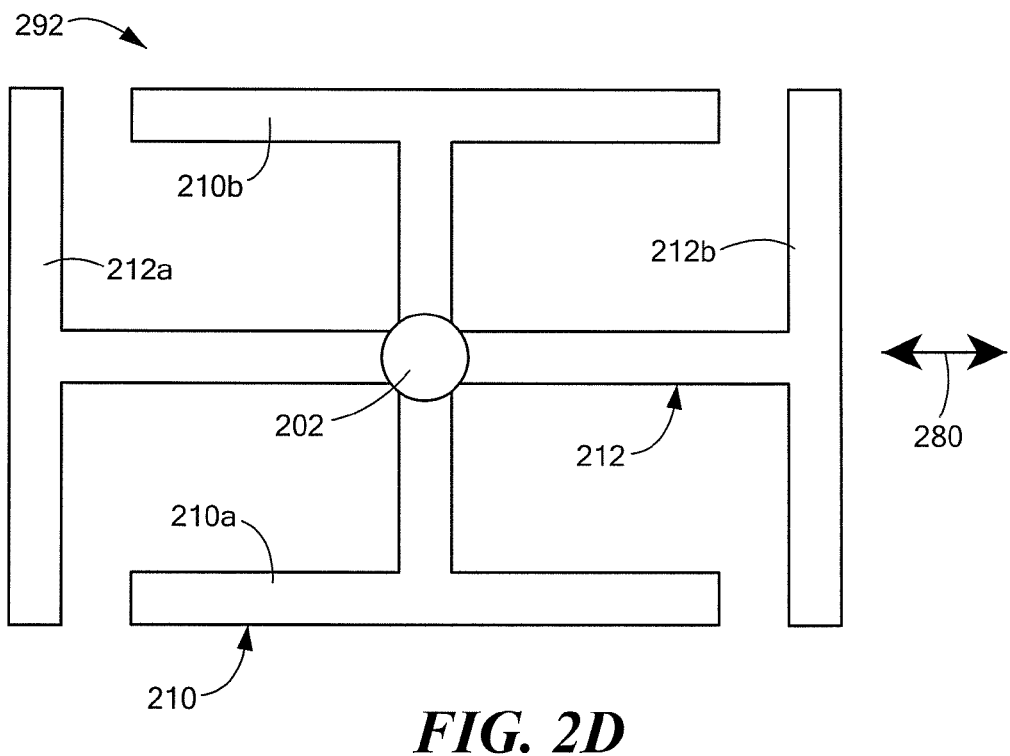
FIG. 2D a symmetric T-shaped configuration of antennas for use with the RFID inlay of FIG. 2A.

It will be understood that the antennas 210, 212 may include various configurations, such as a C-shaped configurations (shown in FIG. 2A), Z-shaped configurations, X-shaped configurations, or symmetric T-shaped configurations, although antennas 210, 212 are not limited to these configurations. For example, referring to FIG. 2C in which like elements of FIG. 2A are shown with like reference numerals, an X-shaped configuration 290 includes a first antenna 210 including at least two elements 210a, 210b, and a second antenna 212 including at least two elements 212a, 212b. The elements are coupled to two-port microchip 202. Antenna 212 may be rotated 180 degrees with respect to antenna 210 about the two-port microchip 202. Referring now to FIG. 2D in which like elements of FIG. 2A are shown with like reference numerals, in still another example, a symmetric T-shaped configuration 292 includes a first antenna 210 including at least two elements 210a, 210b, and a second antenna 212 including at least two elements 212a, 212b. The elements are coupled to two-port microchip 202. Further, elements 210a, 210b may be rotated 180 degrees with respect to each other about the two-port microchip 202, and elements 212a, 212b may be rotated 180 degrees with respect to each other about the two-port microchip 202. Antenna 212 may be rotated 90 degrees with respect to antenna 210 about the two-port microchip 202. One of the antennas may be elongated in one dimension with respect to the other. For example, antenna 212 may be elongated in dimension 280 with respect to antenna 210.

Figure 2E:
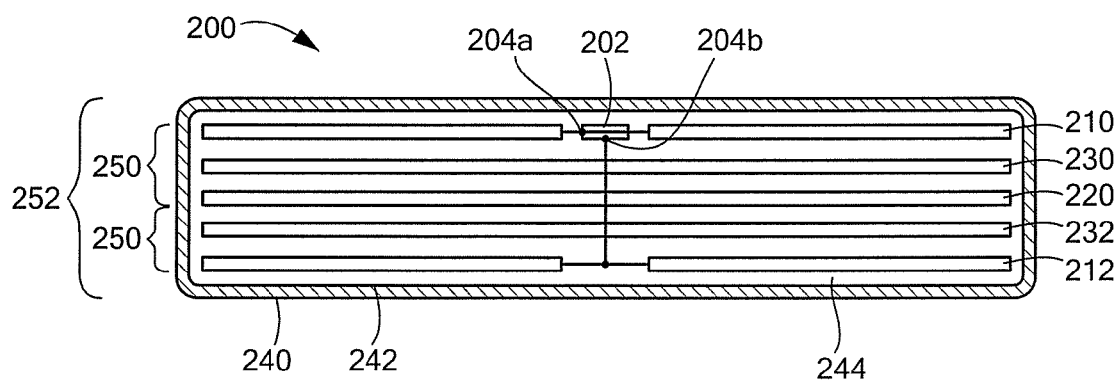
FIG. 2E is a cross-sectional view of the RFID inlay of FIG. 2A at reference line CC'.

Referring now to FIG. 2E showing a cross-sectional view of RFID inlay 200 at line CC' of FIG. 2A, the RFID inlay 200 includes laminate material 240 disposed over an outer surface 242 of the RFID inlay 200. Additionally, the components of the RFID inlay 200 (antennas 210, 212, high-impedance bodies 230, 232, ground-plane 220, microchip 202) may be suspended and separated from each other within a medium 244, for example, a dielectric material such as a plastic. The RFID inlay 200 is an RFID card and the laminate material 240 comprises a plastic material. The laminate material 240 adds tensile strength and protects the RFID card from environmental stresses, such as contact with other surfaces, moisture, dust, etc.

The RFID card can have other elements in addition to the aforementioned RFID inlay elements. For example, an RFID security card can have a photograph and identification information of an employee. Also, the RFID card can include a magnetic stripe for storing, reading, and updating information, a signature block, a logo, a hologram for visual authenticity, textual information, etc.

In an alternate embodiment, the RFID inlay 200 is an RFID tag and the laminate material 240 comprises a paper material. The RFID tag can be used to attach the RFID inlay 200 to a surface, for example, a metallic surface of an object, or a carton containing products. The RFID tag can include an adhesive, such as glue, solder, or an adhesive strip affixed to one side of the RFID tag, for fastening the RFID tag to a surface. Alternatively, the RFID tag can be fastened mechanically, for example, by riveting the RFID tag to a surface.

Figure 3A:
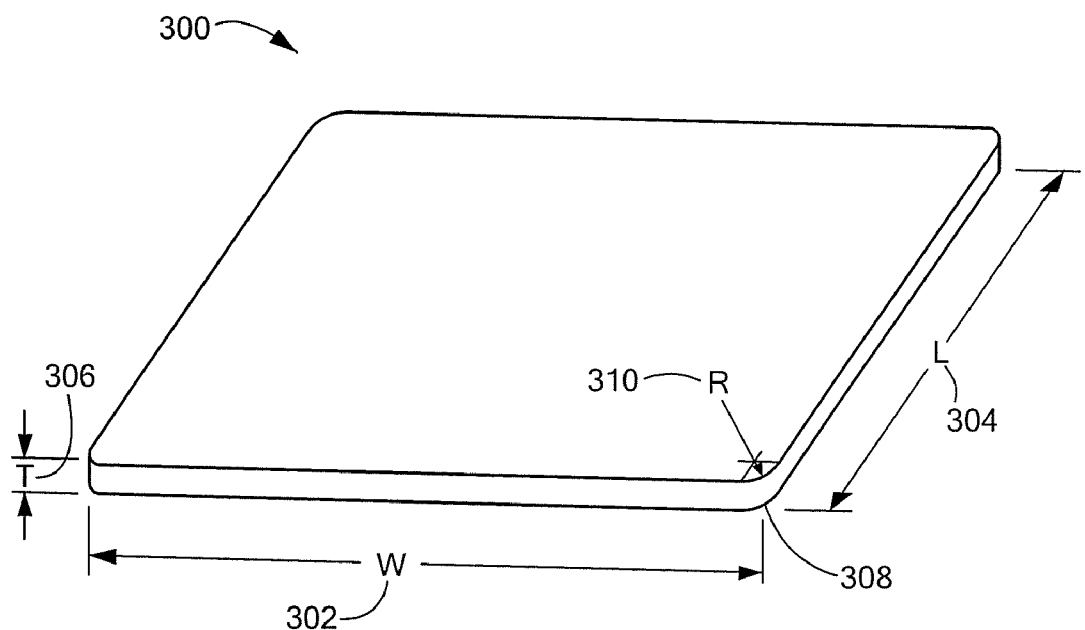
FIG. 3A illustrates an embodiment of the RFID inlay having a width, length, thickness, and radius.

Referring to FIG. 3A, the aforementioned RFID card or RFID tag can have a width 302, a length 304, and a thickness 306. For example, the width 302, length 304, and thickness 306 can be less than or about equal to the dimensions of a standard credit card (including banking and automatic teller machine (ATM) cards), as defined by the International Organization for Standardization (ISO) ID-1 7810 and 7813 standards. In particular, these standards specify a width and length of 86 and 54 millimeters, respectively, and a thickness of 0.76 millimeters. Optionally, the RFID card or RFID tag has rounded corners 308 with a radius 310. For example, the radius can be approximately 3.18 millimeters as defined by ISO 7813.

The RFID card or RFID tag described above is not limited to the aforementioned width 302, length 304, thickness 306, and radial 310 dimensions. For example, the RFID card or RFID tag could be sized less than or equal to 105 millimeters by 74 millimeters (ISO 7810 ID-2 format), less than or equal to 125 millimeters by 88 millimeters (ISO 7810 ID-2 format, which includes passports), or less than or equal to 25 millimeters by 15 millimeters (ISO 7810 ID-000 format, which includes subscriber identification module (SIM) cards).

Figure 3B:
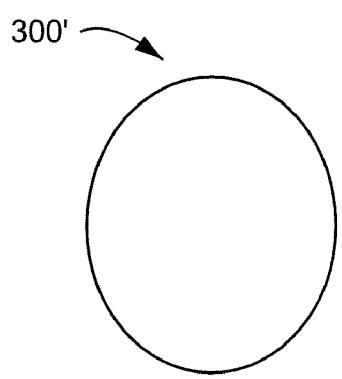
FIG. 3B illustrates an embodiment of the RFID inlay having a round shape.
Figure 3C:
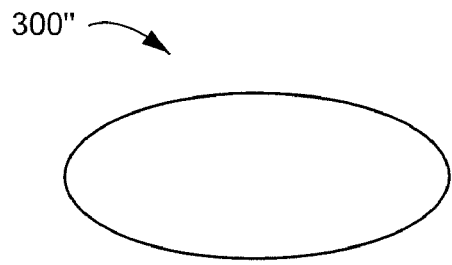
FIG. 3C illustrates an embodiment of the RFID inlay having an oval shape.

Referring again to FIG. 3A and to FIGS. 3B and 3C, the RFID card or RFID tag can have a substantially square shape, a rectangular shape, or a round shape, such as a circle 300' or an oval 300". For example, a RFID card or RFID tag with a round shape is a convenient method for identifying small objects, such as jewelry. The RFID card or RFID tag can be attached to the small objects via a small chain.

Referring again to FIG. 2A, the RFID inlay 200 includes a ground-plane 220 disposed between two isolated RFID antennas 210, 212. The ground-plane 220 can be, but is not limited to, a flat metal sheet which redirects a portion of the electromagnetic radiation of the antennas 210, 212 in the opposite direction. In this way, the ground-plane 220 can improve RF antenna gain. Moreover, the ground-plane 220 shields either of the RF antennas 210, 212 from objects on the other side of the ground-plane 220. Such objects include a human or non-human animal body part, a metallic surface of an object, etc.

Disposing one of the RF antennas 210, 212 too close to the conductive surface of the ground-plane 220 can produce image currents in the ground-plane 220, which can cancel currents in the RF antenna 210, 212 and result in poor antenna radiation efficiency. This problem can be reduced by spacing the antenna elements far enough apart from the ground-plane 220 to reduce the image currents. For example, the spacing between the antenna 210, 212 and the ground-plane 220 can be least ¼ of the operational wavelength of the RF antenna. However, this increases the overall thickness of the RF device, limiting its usefulness. For example, one-quarter of a wavelength at the center frequency of a common UHF RFID band at 915 MHz is about 82 mm (3¼ inches).

The RFID inlay 200 includes a high-impedance body 230 and 232 to reduce the required spacing between the ground-plane 220 and the respective antennas 210, 212 to at least one one-hundredths of a wavelength of the UHF RF operational frequency. In this way, an overall thickness of the RFID inlay 200 can be reduced. For example, the thickness can be reduced to at least 0.76 millimeters, the standard thickness of a credit card.

The high-impedance body 230 or 232 may be a surface and, in particular, an electromagnetic band-gap (EBG) surface. EBG surfaces resonant within a band of frequencies, resulting in low radiation emissions at the band of frequencies. EBG surfaces are commonly composed of a lattice of closely space metallic lands, which are spaced above a conductive sheet and connected via plated through holes, or vias, to the conductive sheet. If the metallic lands are small compared to the operating wavelength of an antenna, the metallic lands can be described using lumped circuit elements, including capacitors and inductors. The lumped circuit elements behave like a network of parallel resonant inductor-capacitor (LC) circuits, acting to block currents along the surface. This property results in very small tangential magnetic fields in the frequency range where in the surface impedance is very high (known as the band-gap range). Additionally, in the band-gap range, a high-impedance surface does not support propagating surface waves, resulting in a smooth pattern free from effects of multipath interference along a ground-plane.

Because the image currents are in-phase, rather than out-of-phase, with radiated energy, an antenna can be disposed close to the EBG surface while still radiating effectively. Referring again to FIG. 1C, a distance 150 between the antenna 110 and the ground-plane 120 can be made to be at least one one-hundredth of the operational wavelength of the RFID inlay 100. Now referring to FIG. 2E, the distance 250 between each of the respective antennas 210, 212 and the ground-plane 220 can be made to be at least one one-hundredth of the operational wavelength of the RFID inlay 200.

The gaps between the lands act as capacitors, while the vias (the physical connectors) act as inductors. The resulting combination forms an EBG surface that reflects incident energy nearly in phase over a small band of frequencies, centered on a resonant frequency. An RFID inlay according to the invention, therefore, provides a high-impedance surface including a capacitor and inductor to produce a resonance at the operational frequency of the RFID system.

Figure 4A:
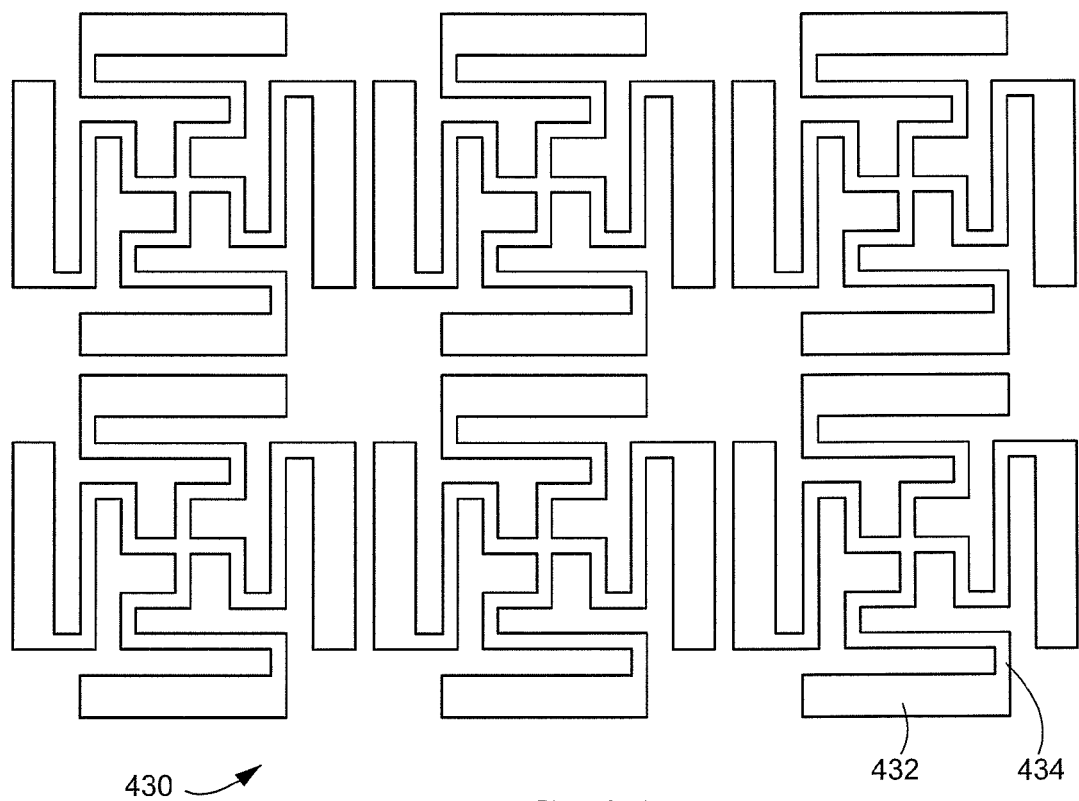
FIG. 4A illustrates an embodiment of a high-impedance body included in the RFID inlay of the inventive systems, techniques, and concepts.
Figure 4B:
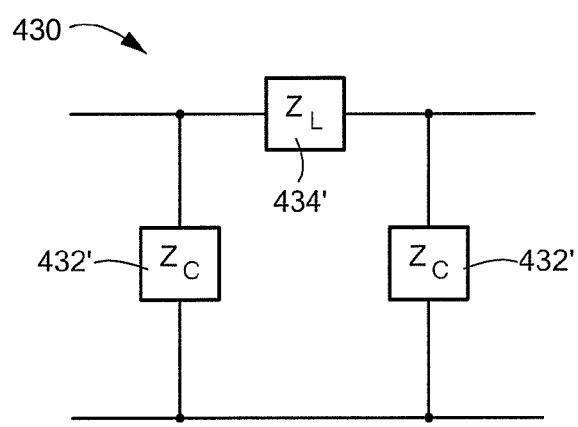
FIG. 4B is a schematic representation of the high-impedance body in FIG. 4A.

Referring to FIGS. 4A and 4B, a high-impedance surface 430 that does not require vias can be created using the dual of this structure. For example, inductive coupling to the ground plane can be accomplished by the lands 432 acting as lumped element capacitors and replacing the capacitance at the gaps between the lands 432 with micro-strip lines 434 that act as inductors.

As shown in FIG. 4B, the high-impedance surface 430 can be represented as a PI tank network, wherein each pair of lands 432' is connected by a micro-strip 434'. The PI tank network blocks the current that flows at a resonant frequency and has a thin structure for the RFID inlay.

Figure 5A:
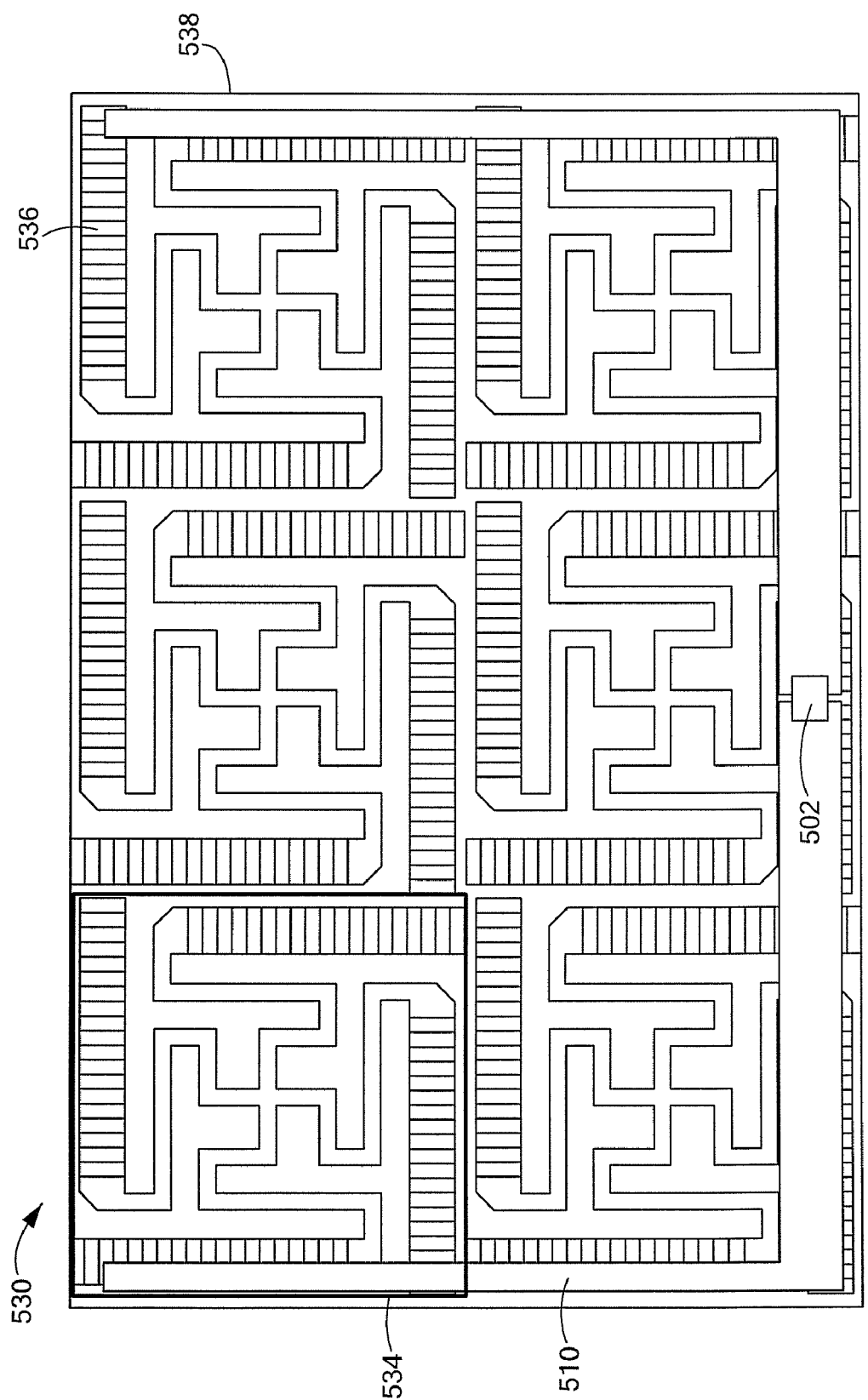
FIG. 5A is illustrates an embodiment of a high-impedance surface having six cells.

An example of a RFID inlay high-impedance surface 530 is shown in FIG. 5A, along with an antenna 510 and microchip 502. The high-impedance surface 532 includes six cells 534 comprising lands and micro-strips. The lands and micro-strips can be comprised of a layer of copper 536 disposed on a base material 538. The copper 536 can be etched using chemical techniques or with a laser to fabricate the lands and micro-strip transmission lines. The size of the lands and the lengths of the lines can be computed to provide a resonance $\omega_O$ within the UHF band as given by Equation 1:

$$\omega_O := \frac{1}{\sqrt{L \cdot C}} \quad \text{Equation 1}$$

Here, L is the effective inductance of the cell and C is the effective capacitance of the cell.

The desired resonance can be determined by modeling the cell as a transmission line network that is open-circuited at its ends and presents the impedance of a short circuit at its center. Traversing the network from one end toward the center encompasses 90 degrees of phase shift at the operating frequency and continuing to the opposite end results in an additional 90 degrees of phase shift. The contributions of each component may be computed from the lossless transmission line equations for an open-circuited line, as shown in Equation 2, to provide the capacitance $Z_{oc}$, and a short circuited line length, as shown in Equation 3, to provide the inductance $Z_{sc}$, though each component contributes both capacitance and inductance to the network.

$$Z_{oc} = -j \cdot Z_o \cdot \cot(\theta) \quad \text{Equation 2:}$$

$$Z_{sc} = j \cdot Z_o \cdot \tan(\theta) \quad \text{Equation 3:}$$

Here, $Z_o$ is the characteristic impedance of the transmission line segment and $\theta$ is the electrical length. The characteristic impedance of a micro-strip transmission line is primarily a function of the width of the strip, its height above the ground plane and the relative permittivity of the media supporting the strip. It is also affected in minor ways by the thickness of the conductive strip and the operating frequency.

Further, to achieve resonance, the impedances at the intersection between the open-circuited and short-circuited lines must be of equal and opposite reactance. That is, the open circuit presents a capacitive reactance equal to the inductive reactance of the line connected to the virtual short-circuit at the center of the network. With this in mind, Equations 2 and 3 can be joined to give a relationship between the parameters of the two segments, as shown in Equation 4:

$$Z_i \cdot \tan(\theta_i) = Z_c \cdot \cot(\theta_c) \quad \text{Equation 4:}$$

Here, the subscripts, c and i, denote the parameters for the capacitive (open-circuit) and inductive (virtual short-circuit) components respectively.

Rearranging Equation 4 to solve for the electrical length of the inductive element gives Equation 5:

$$\theta_i = a\tan\left(\frac{z_c \cdot \cot(\theta_c)}{Z_i}\right) \quad \text{Equation 5}$$

The physical lengths of the network elements can be determined from their electrical lengths according to Equation 6:

$$\text{length} = \frac{\theta \cdot \lambda}{2\pi \cdot \sqrt{\varepsilon_{\mathit{eff}}}} \quad \text{Equation 6}$$

Here, $\theta$ is the electrical length in radians, $\lambda$ is the wavelength, and $\in_{\mathit{eff}}$ is the effective relative permittivity of the transmission line. The effective permittivity when the strip width is greater than its height above the ground plane is given by Equation 7:

$$\varepsilon_{\mathit{eff}} = \frac{\varepsilon_r + 1}{2} + \frac{\varepsilon_r - 1}{2} \cdot \left(\sqrt{1 + \frac{12 \cdot h}{w}}\right)^{-1} \quad \text{Equation 7}$$

Here, $\in_r$ is the relative permittivity of the media, h is the height of the media, and w is the width of the strip.

Figure 5B:
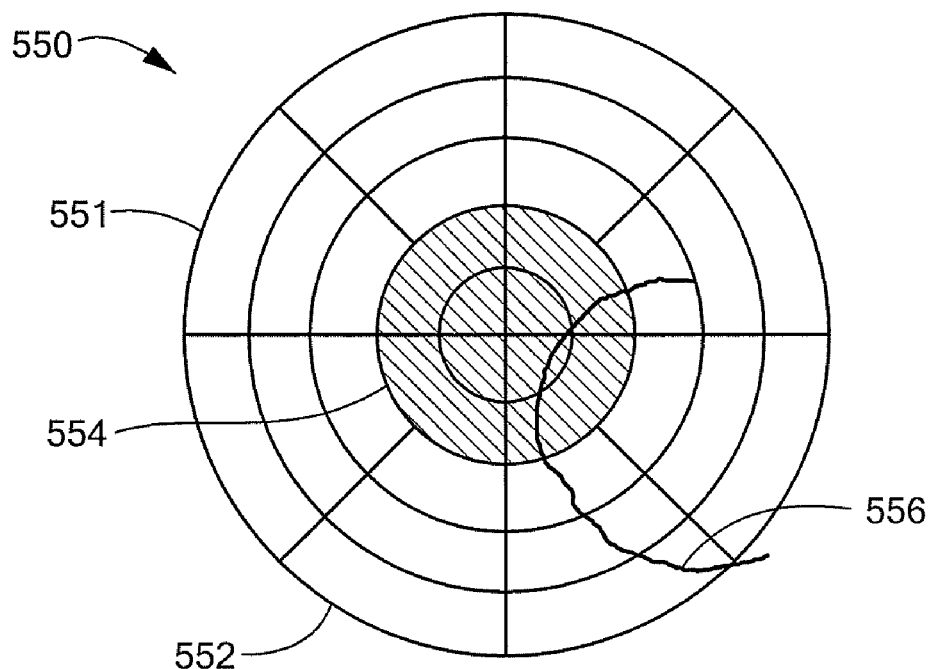
FIG. 5B is a plot of the performance of a RFID antenna over free space.
Figure 5C:
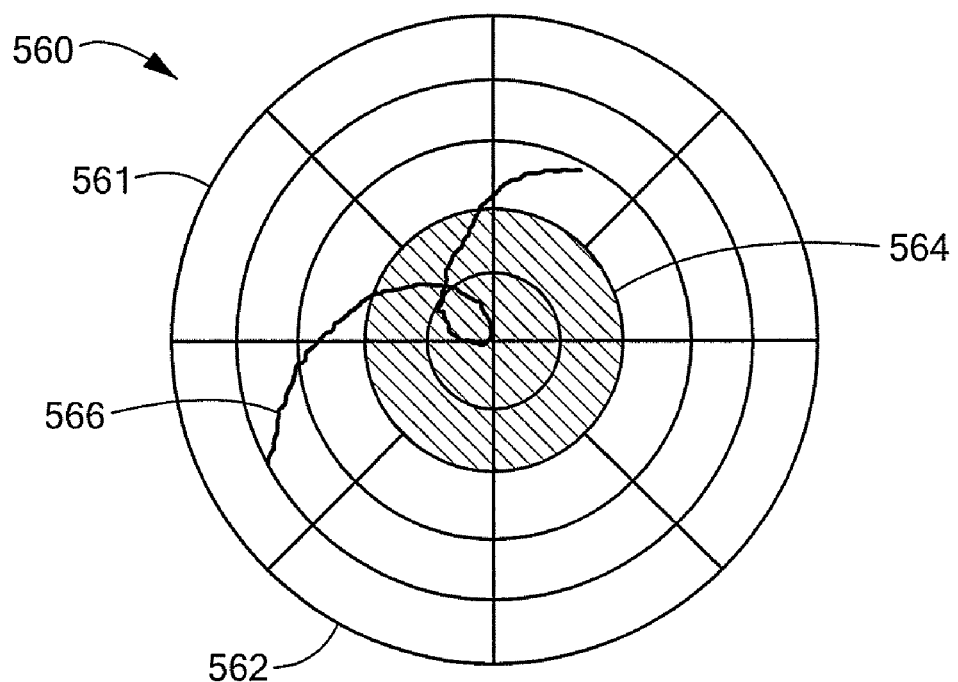
FIG. 5C is a plot of the performance of a RFID antenna over the high-impedance surface in FIG. 5A.
Figure 6:
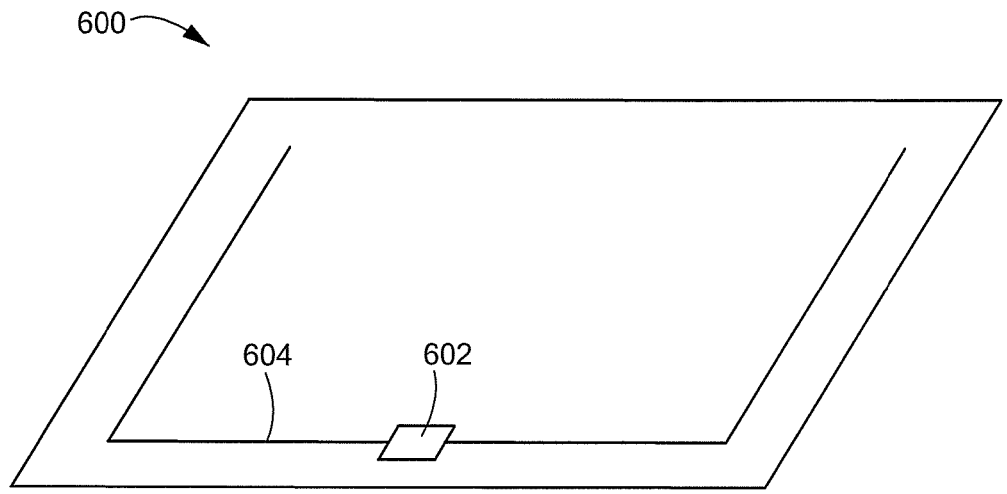
FIG. 6 is a conventional RF antenna having a single microchip.
Figure 7:
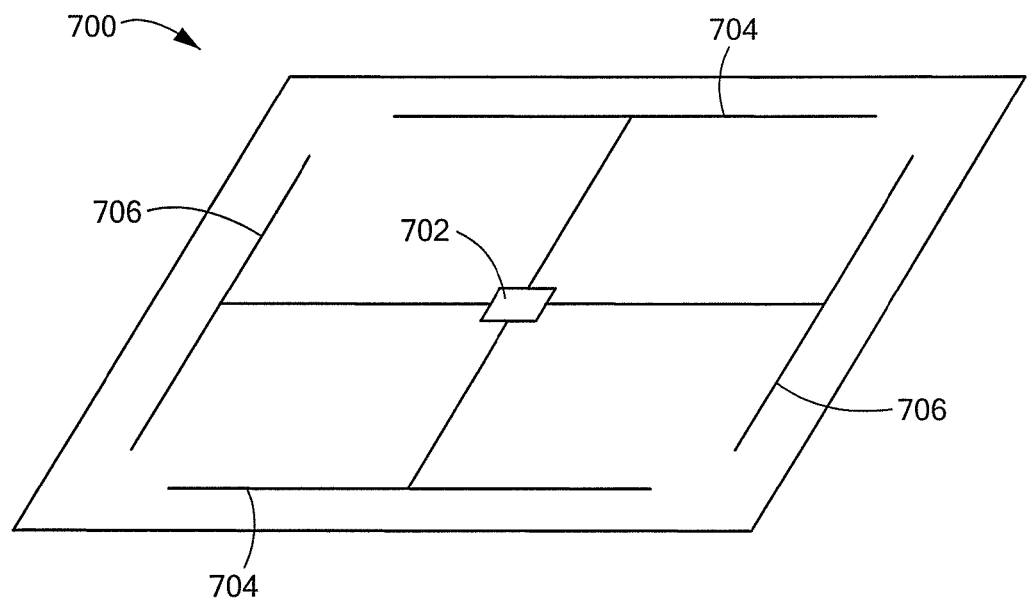
FIG. 7 is a conventional RF antenna having two antennas connected to two insulated microchip ports.

Referring now to FIGS. 5B and 5C, the performance of an antenna over free space 550 and over the high-impedance surface 560 are plotted at various operating frequencies. The performance is a measure complex reflection coefficient of the antenna relative to 50 ohms. The center of the polar diagram indicates a load that is exactly matched to the impedance of the source. The outermost circle indicates a load that is fully reflecting the energy incident at the load, that is, a purely reactive load or a short or open circuit. The upper half of the diagram indicates load impedances having real plus inductive components. The lower half indicates a load impedance that consists of real and capacitive components. The shaded areas 554, 564 at the center of the reflection coefficient plots represent acceptable loads. The curves designated by 556, 566 represent the respective performance of the antenna in free-space and over a high-impedance surface, an embodiment of which is described above. As can be seen by comparing curve 556 with curve 566, curve 566 shows a performance over the high-impedance surface that is substantially similar to the free-space performance of 556, since the impedance represented by curve 566 is within the acceptable load range circle near the center of the plot as it is for curve 556. Moreover, the high-impedance surface can provide an acceptable load range for an antenna while allowing the antenna to be positioned close to a ground plane, for example, a distance of just $\frac{1}{16}^{th}$ of an inch from a ground plane.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A radio-frequency identification (RFID) inlay comprising:
   a microchip;
   an antenna coupled to a port of the microchip;
   a ground-plane disposed substantially parallel to the antenna;

a high-impedance body disposed substantially parallel to the antenna and between the antenna and the ground-plane; and a continuous insulating layer disposed between the ground-plane and the high-impedance body to electrically insulate the high-impedance body from the ground-plane.

2. The RFID inlay of claim 1, further comprising a laminate material disposed over an outer surface of the RFID inlay.

3. The RFID inlay of claim 2, wherein the RFID inlay is an RFID card and the laminate material comprises a plastic material.

4. The RFID card of claim 3, wherein the distance between the antenna and the ground-plane is one one-hundredth of the operational wavelength of the RFID inlay.

5. The RFID card of claim 3 having a thickness less than or equal to 0.76 millimeters.

6. The RFID card of claim 3 having a width less than or equal to 86 millimeters and a length less than or equal to 54 millimeters.

7. The RFID card of claim 3 having a rectangular or a circular shape.

8. The RFID inlay of claim 2, wherein the RFID inlay is an RFID tag and the laminate material comprises a paper material.

9. The RFID tag of claim 8, wherein the distance between the antenna and the ground-plane is one one-hundredth of the operational wavelength of the RFID inlay.

10. The RFID tag of claim 8 having a width less than or equal to 86 millimeters and a length less than or equal to 54 millimeters.

11. The RFID tag of claim 8 having a rectangular or a circular shape.

12. The RFID inlay claim 1, wherein the high-impedance body comprises:

a capacitor and an inductor to produce a resonance at the operational frequency of the RFID inlay.

13. The RFID inlay of claim 1, wherein the antenna is one of a C-shaped, or Z-shaped antenna.

14. A radio-frequency identification (RFID) inlay comprising:

a two-port microchip having a first and a second port;
a first antenna coupled to the first port of the two-port microchip;
a ground-plane;
a first high-impedance body disposed substantially parallel to the first antenna and between the first antenna and the ground-plane;
a second antenna coupled to the second port of the two-port microchip;
a second high-impedance body disposed substantially parallel to the second antenna and between the second antenna and the ground-plane, and;
a continuous insulating layer disposed between the ground-plane and the first high-impedance body to electrically insulate the first high-impedance body from the ground-plane.

15. The RFID inlay of claim 14, further comprising a laminate material disposed over an outer surface.

16. The RFID inlay of claim 15, wherein the RFID inlay is an RFID card and the laminate material comprises a plastic material.

17. The RFID card of claim 16, wherein the distance between each of the antennas and the ground-plane is one one-hundredth of the operational wavelength of the RFID inlay.

18. The RFID card of claim 17 having a thickness is less than or equal to 0.76 millimeters.

19. The RFID card of claim 16 having a width less than or equal to 86 millimeters and a length less than or equal to 54 millimeters.

20. The RFID card of claim 16 having a rectangular or a circular shape.

21. The RFID inlay of claim 15, wherein the RFID inlay is a RFID tag and the laminate material comprises a paper material.

22. The RFID tag of claim 21, wherein the distance between each of the antennas and the ground-plane is one one-hundredth of the operational wavelength of the RFID inlay.

23. The RFID tag of claim 21 having a width less than or equal to 86 millimeters and a length less than or equal to 54 millimeters.

24. The RFID tag of claim 21 having a rectangular or a circular shape.

25. The RFID tag of claim 14, wherein each of the high-impedance bodies comprises:

a capacitor and an inductor to produce a resonance at the operational frequency of the RFID inlay.

26. The RFID tag of claim 14, wherein each of the antennas is one of a C-shaped or Z-shaped antenna.

27. The RFID tag of claim 14, wherein the first and second antennas form an X-shape configuration centered about the two-port microchip.

28. The RFID tag of claim 14, wherein the first antenna further comprises:

a first T-shaped element; and
a second T-shaped element coupled to the first T-shaped element at the two-port microchip, and the second antenna further comprises:

a third T-shaped element; and
a fourth T-shaped element coupled to the third T-shaped element at the two-port microchip, wherein the second antenna is rotated 90 degrees with respect to the first antenna about the two-port microchip.

29. The RFID inlay of claim 1, wherein the high-impedance body comprises:

a plurality of conductive lands coupled by a plurality of conductive strips, the conductive lands coplanar to the conductive strips.

30. The RFID inlay of claim 29, wherein the conductive lands and the conductive strips are segregated into at least six similarly patterned portions.

31. The RFID inlay of claim 14, wherein at least one of the first high-impedance body or the second high-impedance body comprises:

a plurality of conductive lands coupled by a plurality of conductive strips, the conductive lands coplanar to the conductive strips.

32. The RFID inlay of claim 31, wherein the conductive lands and the conductive strips are segregated into at least six similarly patterned portions.

33. The RFID inlay of claim 1, wherein the insulating layer is a first insulating layer, further comprising:

a second insulating layer disposed between the antenna and the high-impendence body to electrically insulate the high-impedance body from the antenna, the first and second insulating layers forming an insulating body about the antenna and the high-impedance body and the ground-plane.

34. The RFID inlay of claim 29, wherein the high-impedance body provides a resonance at the operational frequency of the RFID inlay, wherein the resonance is a function of an area of at least one of the conductive lands and a length of at least one of the conductive strips.

35. The RFID inlay of claim 31, wherein the plurality of conductive lands and the plurality of conductive strips provide a resonance at the operational frequency of the RFID inlay, wherein the resonance is a function of an area of at least one of the conductive lands and a length of at least one of the conductive strips.

36. The RFID inlay of claim 14, wherein the insulating layer is a first insulating layer, further comprising:

a second insulating layer disposed between the first antenna and the first high-impendence body to electrically insulate the first high-impedance body from the first antenna, the first and second insulating layers forming an insulating body about the first antenna and the first high-impedance body and the ground-plane.

* * * * *